March 31, 1936.                V. W. KLIESRATH                2,036,053
                    VALVE FOR CLUTCH CONTROL MECHANISM
                        Original Filed May 29, 1931

INVENTOR.
VICTOR W. KLIESRATH
BY H. O. Clayton
ATTORNEY

Patented Mar. 31, 1936

2,036,053

UNITED STATES PATENT OFFICE 2,036,053

VALVE FOR CLUTCH CONTROL MECHANISM

Victor W. Kliesrath, South Bend, Ind., assignor to Bragg Kliesrath Corporation, Long Island City, N. Y., a corporation of New York Original application May 29, 1931, Serial No. 540,827. Divided and this application October 10, 1931, Serial No. 568,082

2 Claims. (Cl. 303—50)

This invention relates to valves, and particularly to the piston type of valve readily adaptable as a distributor for an automotive vacuum clutch system of the type disclosed in Belcia Patent No. 1,470,272, dated October 9, 1923.

This patent discloses a valve for a clutch controlling vacuum operated fluid actuator, the two operative positions of the valve piston effecting either intercommunication between the source of vacuum and an actuator or intercommunication between the atmosphere and actuator to respectively energize and deenergize the latter.

The present invention, although not necessarily limited to use in such a vacuum operated system, is designed as an improvement over the valve of the aforementioned patent. Accordingly, the principal object of the invention is to provide a very simple type of piston valve, of relatively few parts and, therefore, economical of manufacture.

Other objects and desirable details of construction of the valve will become apparent from the following detailed description of a preferred embodiment of the invention, which embodiment is disclosed in detail in the accompanying drawing, in which:

Figure 1 is a longitudinal sectional view of the valve structure disclosing the parts in the valve open position; and.

Figure 2:
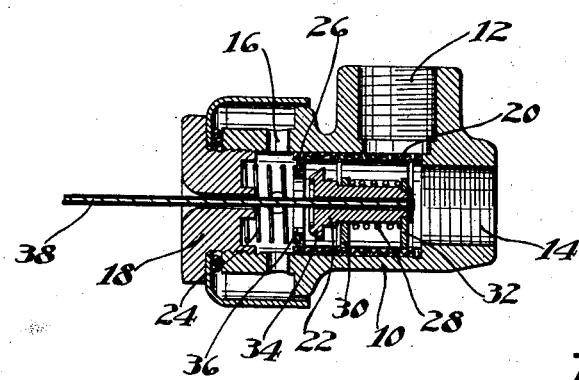
Figure 2 is a similar view disclosing the valve parts in their closed or vented position.
Figure 1:
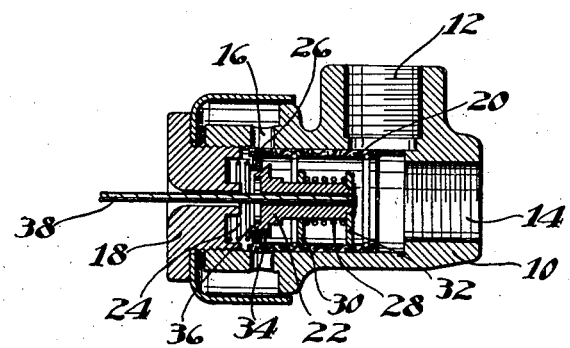

As disclosed in the figures of the drawing, the control valve comprises a casing 10 provided adjacent one of its ends with a port 12 adapted to provide communication, by the usual conduit, not shown, between a source of vacuum, such as the intake manifold of an automotive internal combustion engine, and a fluid motor or sometimes defined as a power actuator.

The casing is provided in its end wall with a port 14, adapted to provide communication with the actuator and with atmospheric outlet ports 16 in a closure or plug member 18 constituting the remaining end wall of the valve casing. Successive communication between the vacuum and actuator ports 12 and 14 and between the atmospheric and actuator ports 16 and 14 is had by virtue of relatively movable reciprocable spring pressed sleeve and piston valve members 20 and 22, respectively. Spring 24, normally compressed between the plug 18 and an end flange 26 on sleeve 20, and spring 28, weaker than spring 24, normally compressed between orificed stops 30 and 32 secured to the sleeve 20 and piston 22, respectively, serve to yieldingly urge the members 20 and 22 to the right. Piston member 22 is provided with a tapered head portion 34 adapted to seat in a complementary recess 36 provided in the end flange 26 of the sleeve member 20.

In operation, the valve is opened, Figure 2, to energize the motor, by registering ports 12 and 14, springs 28 and 24 being successively compressed, by applying tension to rod 38 to seat the member 22 and slide the member 20, and the valve is vented or closed, Figure 2, to deenergize the motor, by relieving the tension on rod 38, permitting successive movement of the members 20 and 22.

There is thus provided a very simple valve structure of relatively few movable parts, and which structure is accordingly unvarying in operation and economical of manufacture.

This application constitutes a division of my application No. 540,827, filed May 29, 1931.

While one illustrative embodiment has been described, it is not my intention to limit the scope of the invention to that particular embodiment, or otherwise than by the terms of the appended claims.

I claim:

1. A control valve for an engine driven vehicle having a vacuum control, comprising a housing having a port open to the control, a port subjected to vacuum, a sleeve movable to open and close the vacuum port, a valve within the sleeve movable relative thereto, a stop member secured to the sleeve and a second stop member secured to the valve, a yieldable member interposed between said stop members to positively interconnect said sleeve with the valve, said valve being urged by said spring to actuate said valve and open the control port to atmosphere when the vacuum port is closed, and means connected to said valve to impart both relative and concurrent movement to said valve and sleeve members.

2. A control valve for a vehicle having a vacuum operated device comprising a housing having a port open to the device and a port subjected to vacuum, a sleeve slidable in the housing to open and close the vacuum port, atmospheric vents adjacent one end of said housing, said sleeve having an internal flange at the end thereof adjacent said vents, a compression spring interposed between one end of said housing and said flange, a valve within said sleeve adapted to seat against said flange, a second spring weaker than the aforementioned spring, interconnecting said valve and sleeve and means for moving said valve against said flange with a collapse of said second mentioned spring and thereafter compressing said first mentioned spring and moving said sleeve whereby communication between said vents and ports will be closed and said vacuum port will be opened.

VICTOR W. KLIESRATH.